United States Patent
Zheng et al.

(10) Patent No.: US 10,205,811 B2
(45) Date of Patent: Feb. 12, 2019

(54) MOBILE DEVICES AND METHODS FOR CONTROLLING SPEAKERS THEREOF

(71) Applicants: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

(72) Inventors: Weibo Zheng, Qingdao (CN); Bingyu Geng, Qingdao (CN); Mingcheng Wen, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/991,993

(22) Filed: May 29, 2018

(65) Prior Publication Data
US 2018/0278735 A1    Sep. 27, 2018

(30) Foreign Application Priority Data
Jun. 2, 2017 (CN) .......................... 2017 1 0409436

(51) Int. Cl.
  H04M 1/03    (2006.01)
  H04R 1/02    (2006.01)
  H04M 1/725   (2006.01)

(52) U.S. Cl.
  CPC ............. *H04M 1/035* (2013.01); *H04M 1/03* (2013.01); *H04M 1/72563* (2013.01);
  (Continued)

(58) Field of Classification Search
  CPC . H04M 1/021; H04M 2250/22; G06F 1/1626; H04W 52/027
  USPC ............... 455/575.3, 575.1, 574, 567, 556.1; 345/156, 660, 173, 174; 379/355.01, 379/90.01
  See application file for complete search history.

(56) References Cited

U.S. PATENT DOCUMENTS

| 2007/0075965 A1* | 4/2007 | Huppi ............... H04M 1/72563 345/156 |
| 2013/0321340 A1* | 12/2013 | Seo ........................ G06F 1/1641 345/174 |
| 2015/0363033 A1* | 12/2015 | Okabe ............... H04W 52/0254 345/173 |

* cited by examiner

Primary Examiner — Kiet M Doan
(74) Attorney, Agent, or Firm — Knobbe, Martens, Olson & Bear, LLP

(57) ABSTRACT

A mobile device and method for controlling a speaker is provided. The method includes detecting when a calling surface of the mobile device changes from one surface to the other surface during a call, wherein the mobile device comprises a body, a first screen and a second screen, sound output holes arranged on both sides, and two speakers, where the first speaker faces the first sound output hole on the front surface, and the second speaker faces the second sound output hole on the back surface. The method further comprises enabling the second speaker facing the back surface, and disabling the first speaker facing the front surface if the calling surface changes from the front surface to the back surface; and enabling the first speaker facing the front surface, and disabling the second speaker facing the back surface if the calling surface doesn't change.

18 Claims, 4 Drawing Sheets

(52) U.S. Cl.
CPC ........... *H04R 1/02* (2013.01); *H04M 1/72569* (2013.01); *H04M 2250/16* (2013.01)

MOBILE DEVICES AND METHODS FOR CONTROLLING SPEAKERS THEREOF

CROSS REFERENCE TO RELATED APPLICATION

This application claims the benefit and the priority to Chinese Patent Application No. 201710409436.X filed Jun. 2, 2017. The entire disclosure of the above application is incorporated herein by reference.

FIELD

The present disclosure relates to the electronics field, and particularly to mobile devices and methods for controlling speakers of the mobile device.

BACKGROUND

As mobile devices are developing rapidly, more and more mobile devices are designed with dual screens. That is, the mobile devices are arranged with screens on both the front surface and back surface thereof.

SUMMARY

Embodiments of the disclosure provide a mobile device, and a method for controlling a speaker thereof.

Some embodiments of the disclosure provide a method for controlling a speaker of a mobile device, where the method includes: detecting when a calling surface of the mobile device where a user is answering a call or making a call changes from a front surface to a back surface or from the back surface to the front surface while sound during the call is being output through a first speaker or a second speaker, wherein the mobile device comprises a body, a first screen on the front surface of the body and a second screen on the back surface of the body with a first and second sound output holes provided respectively on the front surface and back surface, and the first and second speakers respectively correspond to the first screen and the second screen, where the first speaker faces the first sound output hole on the front surface, and the second speaker faces the second sound output hole on the back surface; and in response to that detecting the calling surface changes from the front surface to the back surface, enabling the second speaker facing the back surface, and disabling the first speaker facing the front surface; or in response to that detecting the calling surface changes from the back surface to the front surface, enabling the first speaker facing the front surface, and disabling the second speaker facing the back surface.

Some embodiments of the disclosure provide a mobile device, where the mobile device includes: at least one processor; and a memory connected with the at least one processor, where instructions executable by the at least one processor are stored in the memory, and the execution of the instructions by the at least one processor causes the at least one processor to perform: detecting whether a calling surface of the mobile device where a user is answering a call or making a call changes from a front surface to a back surface or from the back surface to the front surface while sound during the call is being output through a first speaker or a second speaker, where the mobile device comprises a body, a first screen on the front surface of the body and a second screen on the back surface of the body with a first and second sound output holes provided respectively on the front surface and back surface, and the first and second speakers respectively correspond to the first screen and the second screen, where the first speaker faces the first sound output hole on the front surface, and the second speaker faces the second sound output hole on the back surface; and in response to that detecting the calling surface changes from the front surface to the back surface, enabling the second speaker facing the back surface, and disabling the first speaker facing the front surface; or in response to that detecting the calling surface changes from the back surface to the front surface, enabling the first speaker facing the front surface, and disabling the second speaker facing the back surface.

Some embodiments of the disclosure provide a computer readable storage medium on which instructions are stored, where when the instructions stored on the computer readable storage medium is run on a computer, the execution of the instructions cause the computer to perform the method for controlling a speaker of a mobile device.

BRIEF DESCRIPTION OF THE DRAWINGS

In order to make the embodiments of the disclosure more apparent, the accompanying drawings have been included and are described below in brief. The drawings and the following description depict only some of the embodiments of the disclosure.

DETAILED DESCRIPTION

In order to make the objects, technical solutions, and advantages of the disclosure more apparent, embodiments of the disclosure are described below in further details, with reference to the drawings.

A mobile device according to an embodiment of the disclosure includes a body, a first screen on the front surface of the body, and a second screen on the back surface of the body, where there are a plurality of sound output holes including at least one on both the front surface and the back surface of the body, and two speakers are arranged inside the body, one for the first screen and the other for the second screen. In the disclosure, the first screen and the second screen are equally configurable such that both the first screen and the second screen can have display functionality, touch operation functionality, and answering or calling functionality. There are alternative configurations. For example, in one configuration both the first screen and the second screen are liquid crystal screens or Organic Light-Emitting Diode (OLED) screens. In another configuration one screen of the mobile device is a liquid crystal screen or OLED screen, and the other screen of the mobile device is an e-ink screen. For the sake of a convenient description, a screen on the front surface of the body is referred to as a first screen, and a screen on the back surface of the body is referred to as a second screen, although the "front"/"first" and "back"/"second" screens can also be reversed.

In the related technology, for a mobile device designed with dual screens, generally there has only been a speaker arranged on the surface of a main board of the mobile device proximate to a primary screen, and a sound output hole arranged on the surface including the primary screen at a position corresponding to the speaker. When the mobile device receives an incoming call or makes a call, the speaker is enabled to output sound in the call. However the sound in the call is only output from the sound output hole on the surface including the primary screen. It is inconvenient for the user to be constrained to listening to the sound output from just one surface of the mobile device.

Figure 1:
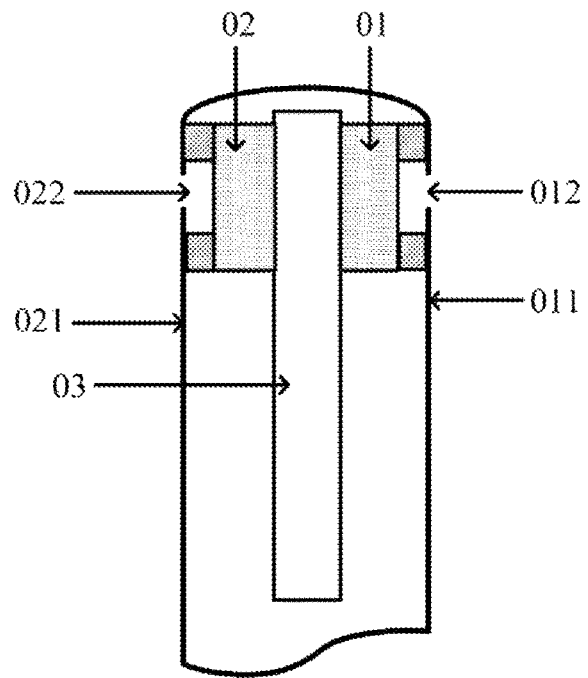
FIG. 1 shows a schematic structural diagram of a mobile device according to an embodiment of the disclosure.

FIG. 1 shows a schematic structural diagram of a mobile device according to an embodiment of the disclosure, and as illustrated in FIG. 1, two speakers including a first speaker 01 and a second speaker 02 are arranged symmetrically in the mobile device, and these two speakers are arranged respectively on two surfaces of a main board 03 of the mobile device, where a sound output face of each speaker faces an sound output hole on the screen corresponding to the speaker. For example, the sound output face of the first speaker 01 in FIG. 1 faces the sound output hole 012 on the surface corresponding to the first screen 011, and a sound output pathway is formed between the sound output face of the first speaker 01, and the sound output hole 012; and the sound output face of the second speaker 02 faces the sound output hole 022 on the surface corresponding to the second screen 021, and a sound output pathway is formed between the sound output face of the second speaker 02, and the sound output hole 022.

Figure 2:
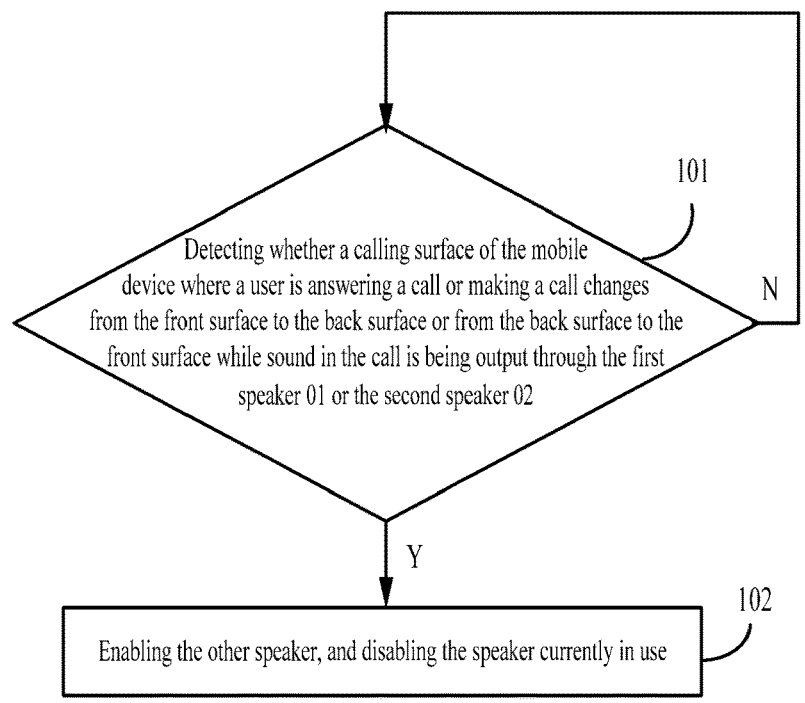
FIG. 2 shows a flow chart of a method for controlling a speaker of a mobile device according to an embodiment of the disclosure.

FIG. 2 shows a flow chart of a method for controlling a speaker according to an embodiment of the disclosure. For example, this method is applicable to the mobile device as illustrated in FIG. 1; and referring to FIG. 2, the method includes the following steps.

Step 101: detecting whether a calling surface of the mobile device where a user is answering a call or making a call changes from the front surface to the back surface or from the back surface to the front surface while sound in the call is being output through the first speaker 01 or the second speaker 02.

When the calling surface of the mobile device changes, the method flows to step 102; and when the calling surface of the mobile device doesn't change, the method continues step 101, that is, detecting whether a calling surface of the mobile device changes.

Here the calling surface refers to one of the front surface and the back surface of the body, which is near an ear of the user who is on the call, and where the user is listening to the sound in the call. For example, if the sound in the call is being output through the first speaker 01, and the user answers the phone through the sound output hole 012 on the front surface corresponding to the screen 011 of the mobile device, the current calling surface is the front surface corresponding to the first screen 011.

Figure 3:
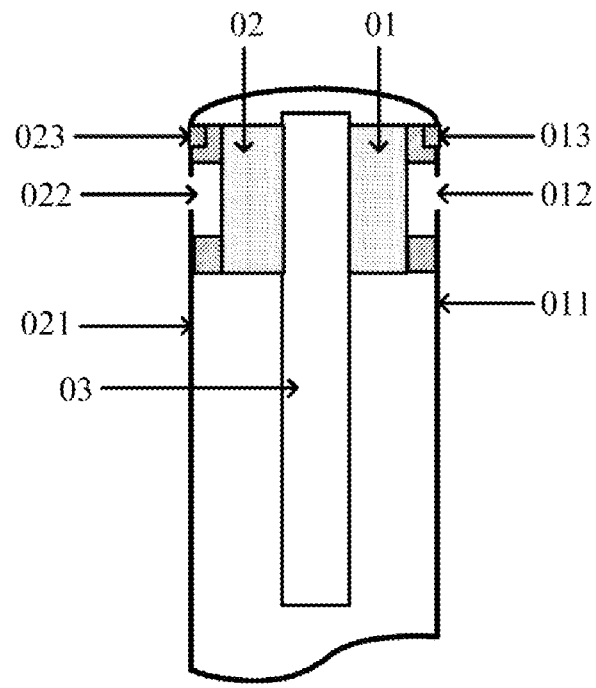
FIG. 3 shows a schematic structural diagram of a mobile device according to another embodiment of the disclosure.

In some embodiments of the disclosure, the mobile device is able to detect whether the calling surface changes by several approaches. In one approach referring to FIG. 3, a distance sensor is arranged inside of each surface of the mobile device, where the distance sensor is configured to detect the distance between the surface corresponding to the distance sensor and a barrier (e.g., skin of the user). By way of example, a first distance sensor 013 is arranged, inside of the front surface corresponding to the first screen 011, near the first speaker 01; and a second distance sensor 023 is arranged, inside of the back surface corresponding to the second screen 021, near the second speaker 02.

During the call, the mobile device is able to obtain in real time a first distance value detected by the distance sensor arranged inside of the current calling surface, and a second distance value detected by the distance sensor arranged inside of the other surface opposite to the calling surface. When the first distance value is greater than a first threshold, and the second distance value is less than a second threshold, it can be determined that the calling surface of the mobile device is changed, where the first threshold and the second threshold can be preset in the mobile device, and the first threshold is greater than or equal to the second threshold.

By way of example, if both the first threshold and the second threshold are 1 cm, when the first distance value detected by the first distance sensor 013 in the mobile device is more than 1 cm, and the second distance value detected by the second distance sensor 023 is less than 1 cm, it is determined that the calling surface of the mobile device is changed, and the method flows to step 102.

In further embodiments, the mobile device is provided with an acceleration sensor, a gyroscope, or another motion sensor or other sensor. The mobile device is able to detect whether an angle change between either surface of the mobile device and the horizontal plane is greater than a preset angle threshold, through the acceleration sensor or the gyroscope; and when the angle change is greater than the preset angle threshold, it is determined that the calling surface of the mobile device is changed, where in some cases the preset angle threshold is 90 degrees.

Figure 4:
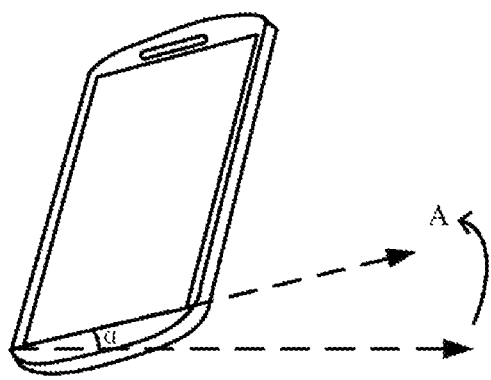
FIG. 4 shows a schematic diagram illustrating the rotation of a mobile device according to an embodiment of the disclosure.

By way of example, FIG. 4 shows a schematic diagram illustrating the rotation of a mobile device according to an embodiment of the disclosure. FIG. 4 depicts a phone slightly inclined from vertical, as it would usually be held by a user during a phone call. As can be seen from FIG. 4, if the user remains stationary, and the inclined mobile device during the call is rotated in direction A along an axis of an edge of the mobile device, the angle α between a plane containing either surface of the mobile device (corresponding to the screens 011, 021) and the horizontal plane is increasing, and when the amount of the angle change α is greater than a preset angle threshold (e.g., 90 degrees), it is determined that the front surface and the back surface of the mobile device are rotated, and the method of FIG. 2 flows to step 102.

Step 102: enabling the other speaker, and disabling the speaker currently in use.

When the calling surface of the mobile device is changed, in order to enable the user to hear the sound in the call without interruption, the mobile device can first enable the other speaker, and then disable the speaker in use, so that the sound in the call can be output from the sound output hole on the other surface.

In some embodiments, the mobile device is provided with an audio controller, which can be used to control the switch of the speakers. During the switch, it is necessary to make sure that the other speaker is enabled first, followed by disabling the speaker in use, which allows a ceaseless sound output, thereby avoiding a sound pause during the call due to the switch of the speakers.

By way of example, when an incoming call is answered, the first speaker 01 is enabled, and the user is answering the incoming call on the front surface corresponding to the first screen 011. If the mobile device detects a 180-degree angle change between the body and the horizontal plane during the call, then the mobile device enables the second speaker 02 corresponding to the second screen 021, and the sound in the call is output from the second sound output hole 022 through the second speaker 02.

According to some embodiments of the disclosure, if the user flips the mobile device or holds the mobile device in another hand while answering or making a call, causing the calling surface change from one surface to another surface, the mobile device is able to detect this change, and switch the states of the two speakers in time, so that the user can continue listening to the sound in the call on the switched calling surface, thus guaranteeing a ceaseless sound output during the call, and improving the quality and flexibility of the call.

It should be noted that there can be distance sensors, so after the mobile device receives or makes a call, if the screen is placed proximate to the ear, then the screen on the surface of the mobile device proximate to the ear of the user is generally adjusted automatically to a sleep state. After the mobile device obtains in real time the values of the distances detected by the two distance sensors in the step 101 (above), when both the first distance value and the second distance value are greater than the first threshold, it is determined that the screen of the mobile device is placed away from the ear of the user. Then, in order to enable the user to operate conveniently the screen on the current calling surface, the mobile device awakes the screen on the current calling surface.

Furthermore when the mobile device further detects that the first distance value is greater than the first threshold, and the second distance value is less than the second threshold, it is determined that the user is making a call using the other calling surface, and in order to save power, and to avoid an inadvertent touch on the two screens, the mobile device turns the screens on the two opposite surfaces into a sleep state.

Figure 5:
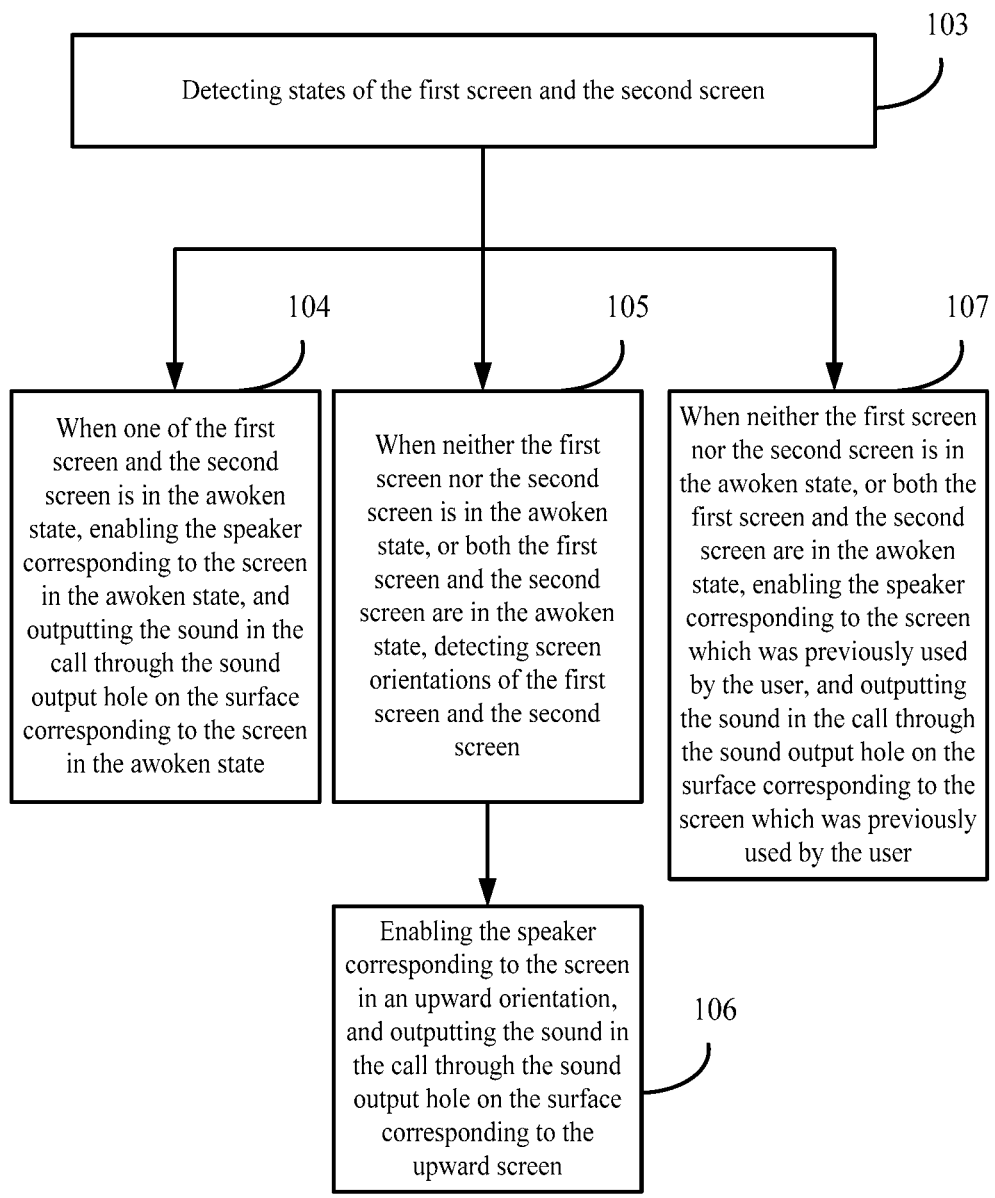
FIG. 5 shows a flow chart of a method for controlling a speaker of the mobile device according to an embodiment of the disclosure.

In some embodiments of the disclosure, before the above step 101 is performed, when the mobile device is receiving a call or making a call, referring to FIG. 5, the mobile device further performs a step 103: detecting states of the first screen and the second screen. The method flows to step 104, step 105, or step 107 based on the detection result from step 103.

Here the screen state includes an awoken state or a sleep state. In some embodiments of the disclosure, a screen monitor application is installed in the mobile device, and the screen monitor application detects the states of the first screen and the second screen, and records the states of the first screen and the second screen by a flag bit. When the mobile device detects that an incoming call is received, or that a call is made, the mobile device refers to the flag bit to determine the state of each screen.

By way of example, if the screen monitor application detects that only the first screen 011 is in awoken state, the flag bit is set to 1; if the screen monitor application detects that only the second screen 021 is in the awoken state, the flag bit is set to 2; if the screen monitor application detects that both the first screen 011 and the second screen 021 are in a sleep state, the flag bit is set to 0; and if the screen monitor application detects that both the first screen 011 and the second screen 021 are in awaken state, the flag bit is set to 3. If the mobile device receiving an incoming call refers to a flag bit which is set to 1, that means the first screen 011 is in awoken state, and the second screen 021 is in a sleep state.

Step 104: when one of the first screen and the second screen is in the awoken state, enabling the speaker corresponding to the screen in the awoken state, and outputting the sound in the call through the sound output hole on the surface corresponding to the screen in the awoken state.

When the mobile device detects that one of the first screen and the second screen is in awoken state, it is determined that the screen in awoken state is the screen being currently used by the user. In order to enable the user to answer or make a call conveniently, the mobile device enables the speaker corresponding to the screen in the awoken state, and the sound in the call is output through the sound output hole on the surface corresponding to the screen in the awoken state.

By way of example, when a call is received by the mobile device and only the first screen 011 is detected in the awoken state, the first speaker 01 corresponding to the first screen 011 is enabled and the sound in the call is output from the first sound output hole 012 through the first speaker 01, which allows the user to answer the call through the first sound output hole 012 on the front surface corresponding to the first screen 011.

Step 105: when neither the first screen nor the second screen is in the awoken state, or both the first screen and the second screen are in the awoken state, detecting screen orientations of the first screen and the second screen. The method then flows to step 106.

When neither the first screen nor the second screen is in the awoken state, or both the first screen and the second screen are in the awoken state, the mobile device can't determine which screen is currently being used by the user based on just this information. In view of this, in some embodiments, the mobile device detects orientations of the screens through gravity sensors (such as an accelerometer), where the orientations include upward or downward orientations. For example, the mobile device determines positions of the two screens relative to the ground through gravity sensors. If the surface of the screen faces away from the ground, the orientation of the screen is determined as an upward orientation; if the surface of the screen faces toward the ground, the orientation of the screen is determined as a downward orientation.

Step 106: enabling the speaker corresponding to the screen in an upward orientation, and outputting the sound in the call through the sound output hole on the surface corresponding to the screen in upward orientation.

Since it is convenient for the user to use the screen which is currently oriented upward, the mobile device enables the speaker corresponding to the upward screen, and outputs the sound in the call through the sound output hole on the surface corresponding to the upward screen.

By way of example, if a call is received by the mobile device, it is detected that the flag bit is 0, and the screen which is currently oriented upward is the second screen 021, then the mobile device enables the second speaker 02 corresponding to the second screen 021 and outputs the sound in the call through the second sound output hole 022 on the back surface corresponding to the second screen 021 so that the user can answer the incoming call conveniently on the second screen 021.

Step 107: when neither the first screen nor the second screen is in the awoken state, or both the first screen and the second screen are in the awoken state, enabling the speaker corresponding to the screen which was previously used by the user, and outputting the sound in the call through the sound output hole on the surface corresponding to the screen which was previously used by the user.

When neither the first screen nor the second screen is in an awoken state, or both the screen and the second screen are in an awoken state, in some embodiments the mobile device can further determine one screen which was previously used by the user. For example, the mobile device determines a screen that previously received a touch instruction from a user as the previously used screen. Then the mobile device enables the speaker corresponding to the previously used screen and outputs the sound in the call through the speaker on the surface corresponding to the screen which was previously used by the user.

It should be noted that the step sequence of the above method can be adjusted as appropriate, and some of the steps may be deleted, or some steps may be added, as needed. Those skilled in the art can make further variations to the embodiments without departing from the scope of the disclosure as claimed.

The disclosure provides a method for controlling a speaker of a mobile device, where the mobile device is able to detect a change of a calling surface of the mobile device while outputting sound in the call through one of the speakers, where the calling surface is one of the two opposite surfaces of the mobile device where a user answers a call or makes a call; and when the calling surface of the mobile device is changed, the mobile device enables the other speaker, and disables the speaker in use, if the user in the call flips the mobile device, or holds the mobile device in another hand, which allows the user to have a ceaseless sound output experience during the call and improves the flexibility for answering a call on mobile device with dual screens.

Figure 6:
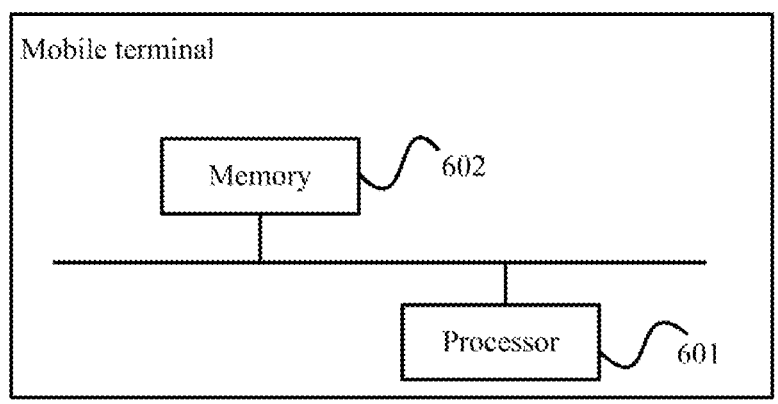
FIG. 6 shows a schematic structural diagram of a mobile device according to further another embodiment of the disclosure.

FIG. 6 shows a schematic structural diagram of a mobile device according to an embodiment of the disclosure, and referring to FIG. 6, the mobile device includes at least one processor 601; and a memory 602 connected with the at least one processor. Instructions executable by the at least one processor 601 are stored in the memory 602, and the execution of the instructions by the at least one processor 601 causes the at least one processor 601 to perform: detecting whether a calling surface of the mobile device where a user is answering a call or making a call changes from a front surface to a back surface or from the back surface to the front surface while sound during the call is being output through a first speaker or a second speaker, where the mobile device comprises a body, a first screen on the front surface of the body and a second screen on the back surface of the body with first and second sound output holes provided respectively on the front surface and back surface, and the first and second speakers respectively correspond to the first screen and the second screen, where the first speaker faces the first sound output hole on the front surface, and the second speaker faces the second sound output hole on the back surface; and in response to that detecting the calling surface changes from the front surface to the back surface, enabling the second speaker facing the back surface, and disabling the first speaker facing the front surface; or in response to that detecting the calling surface changes from the back surface to the front surface, enabling the first speaker facing the front surface, and disabling the second speaker facing the back surface.

In an optional implementation, the body includes a plurality of distance sensors arranged inside the front surface and the back surface of the body, and the execution of the instructions by the at least one processor causes the at least one processor to detect whether the calling surface of the mobile device where the user is answering a call or making a call changes from the front surface to the back surface by: obtaining a first distance value detected by the distance sensor inside the front surface, and a second distance value detected by the distance sensor inside the back surface; and when the first distance value is greater than a first threshold, and the second distance value is less than a second threshold, determining that the calling surface of the mobile device changes from the front surface to the back surface, where the first threshold is greater than or equal to the second threshold.

Optionally after the first distance value detected by the distance sensor inside of the current calling surface, and the second distance value detected by the distance sensor inside of the other surface are obtained, the execution of the instructions by the at least one processor causes the mobile device to further perform: when both the first distance value and the second distance value are greater than the first threshold, awaking the screen on the current calling surface; and when the first distance value is greater than the first threshold, and the second distance value is less than the second threshold, turning the screen corresponding to the calling surface into a sleep state.

In another optional implementation, the execution of the instructions by the at least one processor causes the mobile device to detect whether the calling surface of the mobile device where the user is answering a call or making a call changes from the front surface to the back surface by: detecting whether a change in an angle between the front surface of the mobile device and a horizontal plane is greater than a preset angle threshold, where the angle between the front surface of the mobile device and the horizontal plane is detected by an acceleration sensor or a gyroscope in the mobile device; and in response to that detecting the change in the angle greater than the preset angle threshold, determining that the calling surface of the mobile device where the user is answering a call or making a call changes from the front surface to the back surface.

Optionally, referring to FIG. 6, before the sound in the call is output through the first speaker or the second speaker, the execution of the instructions by the at least one processor causes the mobile device to further perform: upon receiving a call, checking states of the first screen and the second screen, where the state comprises an awoken state and a sleep state; and when one of the first screen and the second screen is in the awoken state, enabling a speaker corresponding to the screen in the awoken state, and outputting the sound in the call through a sound output hole corresponding to the screen in the awoken state.

Optionally, before the sound in the call is output through the first speaker or the second speaker, the execution of the instructions by the at least one processor causes the mobile device to further perform: upon receiving a call, checking state of the first screen and the second screen, where the state comprises an awoken state and a sleep state; when neither the first screen nor the second screen is in the awoken state, or both the first screen and the second screen are in the awoken state, detecting orientations of the first screen and the second screen; and upon detecting that one of the first and second screens is upward orientation, enabling the speaker corresponding to an upward orientation screen, and outputting the sound in the call through the sound output hole corresponding to the upward orientation screen.

Optionally, before the sound in the call is output through the first speaker or the second speaker, the execution of the instructions by the at least one processor causes the at least one processor 601 to further perform: upon receiving a call, checking states of the first screen and the second screen, where the state comprises an awoken state and a sleep state; and when neither the first screen nor the second screen is in the awoken state, or both the first screen and the second screen are in the awoken state, enabling the speaker corresponding to a screen previously used by a user, and outputting the sound in the call through the sound output hole on the screen previously used by the user.

Some embodiments of the disclosure further provide a computer readable storage medium on which instructions are stored, where when the instructions stored on the computer readable storage medium is run on a computer, the execution of the instructions cause the computer to perform the operations of the method for controlling a speaker of mobile device according to the embodiment above.

The embodiments of the disclosure provide a mobile device, and a method for controlling a speaker thereof, where the mobile device is able to detect a change of a calling surface of the mobile device while outputting sound in the call through one of the speakers, where the calling surface is one of the two opposite surfaces of the mobile device where a user answers a call or make a call; and when the calling surface of the mobile device is changed, the mobile device enables the other speaker, and disables the speaker in use, if the user in the call flips the mobile device, or holds the mobile device in another hand, which allows the user to have a ceaseless sound output experience during the call and improves the flexibility for answering a call on mobile device with dual screens.

Those skilled in the art can understand that for a particular operating process of the mobile device as described above, and the respective modules thereof, reference can be made to the corresponding process in the embodiment of the method above for the sake of a convenient and concise description, so a repeated description thereof is omitted here.

The foregoing disclosure is merely illustrative of the preferable embodiments of the disclosure, but not intended to limit the disclosure thereto, and any modifications, equivalent substitutions, adaptations, etc., which can be made thereto without departing from the spirit and principle of the disclosure shall fall into the scope of the disclosure as claimed.

The invention claimed is:

1. A mobile device, comprising:
   a body comprising a front surface and a back surface;
   a first screen on the front surface of the body and a second screen on the back surface of the body;
   first and second sound output holes provided respectively on the front surface and the back surface;
   first and second speakers respectively corresponding to the first screen and the second screen, wherein the first speaker faces the first sound output hole on the front surface, and the second speaker faces the second sound output hole on the back surface;
   at least one processor; and
   a memory connected with the at least one processor, wherein instructions executable by the at least one processor are stored in the memory, and the execution of the instructions by the at least one processor causes the mobile device to perform:
   detecting when a calling surface of the mobile device, where a user is answering a call or making a call, changes from the front surface to the back surface or from the back surface to the front surface while sound during the call is being output through the first speaker or the second speaker; and
   in response to detecting the calling surface change from the front surface to the back surface, enabling the second speaker facing the back surface, and disabling the first speaker facing the front surface; or
   in response to detecting the calling surface change from the back surface to the front surface, enabling the first speaker facing the front surface, and disabling the second speaker facing the back surface;
   wherein the execution of the instructions by the at least one processor causes the mobile device to detect when the calling surface of the mobile device where the user is answering a call or making a call changes by:
   detecting when a change in an angle between a current calling surface of the mobile device and a horizontal plane is greater than a preset angle threshold; and
   in response to that detecting the change in the angle greater than the preset angle threshold, determining that the calling surface of the mobile device where the user is answering a call or making a call changes.

2. The mobile device according to claim 1, further comprising at least one distance sensor arranged inside the front surface and at least one distance sensor arranged inside the back surface of the body, the execution of the instructions by the at least one processor causing the mobile device to detect when the calling surface of the mobile device where the user is answering a call or making a call changes by:
   obtaining a first distance value detected by a distance sensor inside the front surface, and a second distance value detected by a distance sensor inside the back surface; and
   when the distance value corresponding to a current calling surface is greater than a first threshold, and the distance value corresponding to the other surface is less than a second threshold, determining that the calling surface of the mobile device changes.

3. The mobile device according to claim 2, wherein the first threshold is greater than or equal to the second threshold.

4. The mobile device according to claim 3, wherein after obtaining the first distance value detected by the distance sensor inside the front surface and the second distance value detected by the distance sensor inside the back surface, the execution of the instructions by the at least one processor causes the mobile device to further perform:
   when both the first distance value and the second distance value are greater than the first threshold, awaking a screen corresponding to the current calling surface; and
   when the distance value corresponding to the current calling surface is greater than the first threshold and the distance value corresponding to the other surface is less than the second threshold, turning the screen corresponding to the calling surface into a sleep state.

5. The mobile device according to claim 1, wherein the angle between the current calling surface of the mobile device and the horizontal plane is detected by an acceleration sensor in the mobile device.

6. The mobile device according to claim 1, wherein the angle between the current calling surface of the mobile device and the horizontal plane is detected by a gyroscope in the mobile device.

7. The mobile device according to claim 1, wherein the execution of the instructions by the at least one processor causes the mobile device to further perform:
   upon receiving a call, checking states of the first screen and the second screen, wherein the state comprises an awoken state and a sleep state; and
   when one of the first screen and the second screen is in the awoken state, enabling a speaker corresponding to the screen in the awoken state, and outputting the sound in the call through a sound output hole corresponding to the screen in the awoken state.

8. The mobile device according to claim 1, wherein the execution of the instructions by the at least one processor causes the mobile device to further perform:
  upon receiving a call, checking state of the first screen and the second screen, wherein the state comprises an awoken state and a sleep state;
  when neither the first screen nor the second screen is in the awoken state, or both the first screen and the second screen are in the awoken state, detecting orientations of the first screen and the second screen; and
  upon detecting that one of the first and second screens is in an upward orientation, enabling the speaker corresponding to the screen with an upward orientation, and outputting the sound in the call through the sound output hole corresponding to the screen with an upward orientation.

9. The mobile device according to claim 1, wherein the execution of the instructions by the at least one processor causes the mobile device further to perform:
  upon receiving a call, checking states of the first screen and the second screen, wherein the state comprises an awoken state and a sleep state; and
  when neither the first screen nor the second screen is in the awoken state, or both the first screen and the second screen are in the awoken state, enabling the speaker corresponding to a screen previously used by a user, and outputting the sound in the call through the sound output hole on the screen previously used by the user.

10. A method for controlling a speaker of a mobile device, comprising:
  detecting when a calling surface of the mobile device, where a user is answering a call or making a call, changes from a front surface to a back surface or from the back surface to the front surface while sound during the call is being output through a first speaker or a second speaker, wherein the mobile device comprises a body, a first screen on the front surface of the body and a second screen on the back surface of the body with first and second sound output holes provided respectively on the front surface and back surface, and the first and second speakers respectively correspond to the first screen and the second screen, wherein the first speaker faces the first sound output hole on the front surface, and the second speaker faces the second sound output hole on the back surface; and
  in response to detecting the calling surface change from the front surface to the back surface, enabling the second speaker facing the back surface, and disabling the first speaker facing the front surface; or
  in response to detecting the calling surface change from the back surface to the front surface, enabling the first speaker facing the front surface, and disabling the second speaker facing the back surface;
  wherein the detecting when the calling surface of the mobile device where the user is answering a call or making a call changes comprises:
  detecting when a change in an angle between a current calling surface of the mobile device and a horizontal plane is greater than a preset angle threshold; and
  in response to that detecting the change in the angle greater than the preset angle threshold, determining that the calling surface of the mobile device where the user is answering a call or making a call changes.

11. The method according to claim 10, wherein the body comprises at least one distance sensor arranged inside the front surface and at least one distance sensor arranged inside the back surface of the body, and the detecting when the calling surface of the mobile device where the user is answering a call or making a call changes comprises:
  obtaining a first distance value detected by a distance sensor inside the front surface, and a second distance value detected by a distance sensor inside the back surface; and
  when the distance value corresponding to a current calling surface is greater than a first threshold, and the distance value corresponding to the other surface is less than a second threshold, determining that the calling surface of the mobile device changes.

12. The method of claim 11, wherein the first threshold is greater than or equal to the second threshold.

13. The method according to claim 12, wherein after obtaining the first distance value detected by the distance sensor inside the front surface, and the second distance value detected by the distance sensor inside the back surface, the method further comprises:
  when both the first distance value and the second distance value are greater than the first threshold, awaking a screen corresponding to the current calling surface; and
  when the distance value corresponding to the current calling surface is greater than the first threshold and the distance value corresponding to the other surface is less than the second threshold, turning the screen corresponding to the calling surface into a sleep state.

14. The method according to claim 10, wherein the angle between the current calling surface of the mobile device and the horizontal plane is detected by an acceleration sensor in the mobile device.

15. The method according to claim 10, wherein the angle between the current calling surface of the mobile device and the horizontal plane is detected by a gyroscope in the mobile device.

16. The method according to claim 10, the method further comprises:
  upon receiving a call, checking states of the first screen and the second screen, wherein the state comprises an awoken state and a sleep state; and
  when one of the first screen and the second screen is in the awoken state, enabling a speaker corresponding to the screen in the awoken state, and outputting the sound in the call through a sound output hole corresponding to the screen in the awoken state.

17. The method according to claim 10, the method further comprises:
  upon receiving a call, checking states of the first screen and the second screen, wherein the state comprises an awoken state and a sleep state;
  when neither the first screen nor the second screen is in the awoken state, or both the first screen and the second screen are in the awoken state, detecting orientations of the first screen and the second screen; and
  upon detecting that one of the first and second screens is in an upward orientation, enabling the speaker corresponding to the screen with an upward orientation, and outputting the sound in the call through the sound output hole corresponding to the screen with an upward orientation.

18. The method according to claim 10, the method further comprises:
  upon receiving a call, checking states of the first screen and the second screen, wherein the state comprises an awoken state and a sleep state; and
  when neither the first screen nor the second screen is in the awoken state, or both the first screen and the second screen are in the awoken state, enabling the speaker corresponding to a screen previously used by a user, and outputting the sound in the call through the sound output hole on the screen previously used by the user.

\* \* \* \* \*